(12) United States Patent
Li

(10) Patent No.: US 12,393,254 B2
(45) Date of Patent: Aug. 19, 2025

(54) METHOD AND APPARATUS FOR ADJUSTING POWER CONSUMPTION, STORAGE DEVICE, AND NON-TRANSITORY COMPUTER READABLE STORAGE MEDIUM

(71) Applicant: SUZHOU METABRAIN INTELLIGENT TECHNOLOGY CO., LTD., Jiangsu (CN)

(72) Inventor: Hanqing Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/572,924

(22) PCT Filed: Sep. 29, 2022

(86) PCT No.: PCT/CN2022/122793
§ 371 (c)(1),
(2) Date: Dec. 21, 2023

(87) PCT Pub. No.: WO2023/147727
PCT Pub. Date: Aug. 10, 2023

(65) Prior Publication Data
US 2024/0295917 A1 Sep. 5, 2024

(30) Foreign Application Priority Data
Feb. 7, 2022 (CN) .......................... 202210115471.1

(51) Int. Cl.
*G06F 1/32* (2019.01)
*G06F 1/3234* (2019.01)

(52) U.S. Cl.
CPC ................... *G06F 1/3275* (2013.01)

(58) Field of Classification Search
CPC .................................................... G06F 1/3275
See application file for complete search history.

(56) References Cited

U.S. PATENT DOCUMENTS

| 2015/0185799 A1 | 7/2015 | Robles et al. |
| 2015/0331473 A1* | 11/2015 | Jreji ...................... G06F 1/3268 |
| | | 713/320 |

(Continued)

FOREIGN PATENT DOCUMENTS

| CN | 101699413 A | 4/2010 |
| CN | 106033345 A | 10/2016 |

(Continued)

OTHER PUBLICATIONS

International Search Report issued for International Patent Application No. PCT/CN2022/122793 mailed Dec. 15, 2022, 13 pgs.

(Continued)

*Primary Examiner* — Stefan Stoynov
(74) *Attorney, Agent, or Firm* — Merchant & Gould P.C.

(57) ABSTRACT

The present application relates to the field of storage devices, in particular to a method and apparatus for adjusting power consumption, a storage device, and a non-transitory computer readable storage medium. The method includes: acquiring current power consumption of the storage device (S11); comparing target power consumption of the storage device at a current power consumption level with the current power consumption to adjust an initial upper limit value corresponding to the storage device, so as to obtain an adjusted target upper limit value (S12); adjusting a number of logical units performing a read and write task in the storage device according to the target upper limit value, so as to adjust the current power consumption of the storage device (S13). According to the method, the power consumption of the storage device is adjusted.

20 Claims, 5 Drawing Sheets

(56) References Cited

U.S. PATENT DOCUMENTS

| | | | |
|---|---|---|---|
| 2019/0278495 A1* | 9/2019 | Klein | G06F 3/0625 |
| 2021/0200481 A1* | 7/2021 | Buxton | G06F 9/4418 |
| 2023/0288980 A1 | 9/2023 | Duan et al. | |

FOREIGN PATENT DOCUMENTS

| | | | |
|---|---|---|---|
| CN | 106470167 A | 3/2017 |
| CN | 108196482 A | 6/2018 |
| CN | 108984330 A | 12/2018 |
| CN | 111949478 A | 11/2020 |
| CN | 112084089 A | 12/2020 |
| CN | 112214095 A | 1/2021 |
| CN | 112558747 A | 3/2021 |
| CN | 112558748 A | 3/2021 |
| CN | 113625862 A | 11/2021 |
| CN | 113688001 A | 11/2021 |
| CN | 114138098 A | 3/2022 |

OTHER PUBLICATIONS

Search Report issued for Chinese Patent Application No. 202210115471.1 dated Mar. 9, 2022, 2 pgs.

\* cited by examiner

METHOD AND APPARATUS FOR ADJUSTING POWER CONSUMPTION, STORAGE DEVICE, AND NON-TRANSITORY COMPUTER READABLE STORAGE MEDIUM

CROSS-REFERENCE TO RELATED APPLICATION

The present application is a National Stage Application of PCT International Application No.: PCT/CN2022/122793 filed on Sep. 29, 2022, which claims priority to Chinese Patent Application 202210115471.1, filed in the China National Intellectual Property Administration on Feb. 7, 2022, the disclosure of which is incorporated herein by reference in its entirety.

TECHNICAL FIELD

The disclosure relates to the field of storage devices, in particular to a method for adjusting power consumption and apparatus, a storage device, and a non-transitory readable storage medium.

BACKGROUND

Storage devices, as a medium for data storage, are a crucial component of a computer system. Solid state drives (SSDs) are becoming mainstream devices in the storage world due to their fast read/write performance, large capacity, shock and drop resistance, and compact size. As the performance of hard disks is improved, power consumption thereof also increases, so it is necessary to adopt efficient power consumption control strategies to actively regulate the power consumption and performance of the SSDs.

The main power consumption of a SSD may be divided into two parts: one is non-operational state power consumption, i.e., idle power consumption, where the SSD does not have a user data read/write operation and only maintains the normal operation of a controller and processes Admin commands; and the other is power consumption consumed for completion of the read/write (i.e., read, write or erase) operation. Idle power consumption is necessary for the normal operation of the SSD and may not be adjusted, so the power consumption which may be dynamically adjusted is power consumed for the completion of the read/write operation.

In the prior art, a flash power manager power allocation (FPMPA) register in the SSD stores an upper limit value of the maximum power consumption corresponding to the SSD, and the SSD may call corresponding logical units to accomplish the read/write task according to the upper limit value corresponding to the maximum power consumption. Each logical unit is a unit including at least one flash channel, and the flash channels are used to accomplish the read/write task. In addition, the FPMPA may record the sum of the power consumption of the logical units.

However, there is no method for adjusting the power consumed by a storage device for accomplishing the read/write task in the prior art.

SUMMARY

In view of that, an embodiment of the disclosure provides a method for adjusting power consumption to solve the problem that power consumed by a storage device when accomplishing a read/write task may not be adjusted.

According to a first aspect, an embodiment of the disclosure provides a method for adjusting power consumption. The method is applied to a storage device and includes:
acquiring current power consumption of the storage device;
comparing target power consumption of the storage device at a current power consumption level with the current power consumption to adjust an initial upper limit value corresponding to the storage device, so as to obtain an adjusted target upper limit value; and
adjusting, according to the target upper limit value, the number of logical units performing a read/write task in the storage device, so as to adjust the current power consumption of the storage device.

According to the method for adjusting power consumption, provided by the embodiment of the disclosure, the current power consumption of the storage device is acquired, and then the target power consumption of the storage device at the current power consumption level is compared with the current power consumption to adjust the initial upper limit value corresponding s to the storage device, so as to obtain the adjusted target upper limit value. Thus, the storage device may adjust the number of the logical units performing the read/write task in the storage device according to the target upper limit value, so as to adjust the current power consumption of the storage device. Therefore, by adjusting the initial upper limit value corresponding to the storage device to obtain the target upper limit value, the number of the logical units performing the read/write task in the storage device is adjusted, thereby achieving adjustment of the power consumption of the storage device. The situation that normal use by a user is affected and inconvenience is caused to the user due to abnormal operation of the storage device caused by excessive current power consumption of the storage device may be avoided.

In an embodiment, the comparing target power consumption of the storage device at a current power consumption level with the current power consumption to adjust an initial upper limit value corresponding to the storage device, so as to obtain an adjusted target upper limit value includes:
calculating a difference between the current power consumption and the target power consumption; and
adjusting, according to the difference, the initial upper limit value to obtain the adjusted target upper limit value.

According to the method for adjusting power consumption provided by the embodiment of the disclosure, the difference between the current power consumption and the target power consumption is calculated, and then the initial upper limit value is adjusted according to the difference, so as to obtain the adjusted target upper limit value. Thus, the accuracy of the target upper limit value obtained after adjustment of the initial upper limit value is ensured, thereby ensuring the accuracy of adjusting the number of logical units performing the read/write task according to the target upper limit value.

In an embodiment, the adjusting, according to the difference, the initial upper limit value to obtain the adjusted target upper limit value includes:
acquiring, in a case that the difference is greater than a preset difference, an adjustment ratio corresponding to the storage device; and
adjusting, according to the adjustment ratio and the difference, the initial upper limit value to obtain the adjusted target upper limit value.

According to the method for adjusting power consumption provided by the embodiment of the disclosure, when the difference is greater than the preset difference, the adjustment ratio corresponding to the storage device is acquired, and then the initial upper limit value is adjusted according to the adjustment ratio and the difference, so as to obtain the adjusted target upper limit value. Thus, the accuracy of the obtained adjusted target upper limit value is ensured.

In an embodiment, the method further includes:
acquiring, in a case that differences within a preset number of times are all less than or equal to the preset difference, an integration constant according to the preset number of times; and
adjusting, according to the integration constant and a sum of the differences, the initial upper limit value to obtain the adjusted target upper limit value.

According to the method for adjusting power consumption provided by the embodiment of the disclosure, when the differences within the preset number of times are all less than or equal to the preset difference, the integration constant is acquired according to the preset number of times, and then the initial upper limit value is adjusted according to the integration constant and the sum of the differences, so as to obtain the adjusted target upper limit value. Thus, the accuracy of the obtained adjusted target upper limit value is ensured.

In an embodiment, before comparing target power consumption of the storage device at a current power consumption level with the current power consumption to adjust an initial upper limit value corresponding to the storage device, so as to obtain an adjusted target upper limit value, the method further includes:
acquiring the current power consumption level;
querying, according to the current power consumption level, rated power consumption corresponding to the current power consumption level;
acquiring a safety difference corresponding to the current power consumption level; and
subtracting the safety difference from the rated power consumption to calculate the target power consumption of the storage device at the current power consumption level.

According to the method for adjusting power consumption provided by the embodiment of the disclosure, the current power consumption level is acquired, and the rated power consumption corresponding to the current power consumption level is queried according to the current power consumption level. Thus, the accuracy of the queried rated power consumption corresponding to the current power consumption level is ensured. Then, the safety difference corresponding to the current power consumption level is acquired, and the target power consumption of the storage device at the current power consumption level is calculated by subtracting the safety difference from the rated power consumption. Thus, the accuracy of the calculated target power consumption of the storage device at the current power consumption level is ensured, and the safety of the storage device is ensured when the power consumption reaches the target power consumption at the current power consumption level.

In an embodiment, the querying, according to the current power consumption level, rated power consumption corresponding to the current power consumption level includes:
judging, according to a preset power consumption level range, whether the current power consumption level is valid; and in a case that the current power consumption level is valid, querying, according to the current power consumption level, the rated power consumption corresponding to the current power consumption level.

According to the method for adjusting power consumption provided by the embodiment of the disclosure, whether the current power consumption level is valid is determined according to the preset power consumption level range, so that validity of the current power consumption level is ensured. In the case that the current power consumption level is valid, the rated power consumption corresponding to the current power consumption level is queried according to the current power consumption level. Thus, the accuracy of the queried rated power consumption corresponding to the current power consumption level is ensured.

In an embodiment, the acquiring current power consumption of the storage device includes:
sampling a current sensor and/or a voltage sensor; and
acquiring, according to sampling data, the current power consumption of the storage device, and indicating that the storage device is undergoing power consumption adjustment.

According to the method for adjusting power consumption provided by the embodiment of the disclosure, the current sensor and/or the voltage sensor is sampled, so that the accuracy of the obtained sampling data may be ensured. Then, the current power consumption of the storage device is acquired according to the sampling data, and it is indicated that the storage device is undergoing power consumption adjustment, so that the accuracy of the acquired current power consumption of the storage device is ensured. In addition, by indicating that the storage device is undergoing power consumption adjustment, the user may clearly know that the storage device is undergoing power consumption adjustment.

In an embodiment, before comparing target power consumption of the storage device at a current power consumption level with the current power consumption to adjust an initial upper limit value corresponding to the storage device, the method further includes:
determining, according to the current power consumption level, the initial upper limit value corresponding to the current power consumption level.

In an embodiment, the adjusting, according to the target upper limit value, the number of logical units performing a read/write task in the storage device, so as to adjust the current power consumption of the storage device includes:
reducing, according to the target upper limit value and a program of the task being performed by the storage device, the number of logical units that are performing at least one of a read operation, a write operation, and an erase operation.

In an embodiment, the acquiring, in a case that differences within a preset number of times are all less than or equal to the preset difference, an integration constant according to the preset number of times includes:
determining, in a case that the differences within the preset number of times are all less than or equal to the preset difference, that there is a static error between the current power consumption and the target power consumption.

In an embodiment, the sampling a current sensor and/or a voltage sensor includes:
sampling the current sensor and/or the voltage sensor a plurality of times.

In an embodiment, the acquiring, according to sampling data, the current power consumption of the storage device includes:

acquiring the current power consumption of the storage device by multiplying collected current data by voltage data.

In an embodiment, the indicating that the storage device is undergoing power consumption adjustment includes:

indicating that the storage device is undergoing power consumption adjustment by controlling a power consumption adjustment indicator of the storage device to emit light.

In an embodiment, the acquiring the current power consumption level includes:

receiving the current power consumption level input by a user.

In an embodiment, the determining, according to a preset power consumption level range, whether the current power consumption level is valid includes:

determining, in a case that the current power consumption level of the storage device is within the power consumption level range, that the current power consumption level is valid; and determining, in a case that the current power consumption level of the storage device is not within the power consumption level range, that the current power consumption level is invalid.

In an embodiment, the determining, according to a preset power consumption level range, whether the current power consumption level is valid further includes:

outputting, in a case that the current power consumption level is invalid, a message indicating that the current power consumption is invalid.

In an embodiment, the acquiring a safety difference corresponding to the current power consumption level includes:

upon determining that the current power consumption level of the storage device is valid, acquiring, according to the current power consumption level, the safety difference corresponding to the current power consumption level.

According to a second aspect, an embodiment of the disclosure further provides an apparatus for adjusting power consumption. The apparatus is applied to a storage device and includes:

a first acquisition module, configured to acquire current power consumption of the storage device;

a first adjustment module, configured to compare target power consumption of the storage device at a current power consumption level with the current power consumption to adjust an initial upper limit value corresponding to the storage device, so as to obtain an adjusted target upper limit value; and a second adjustment module, configured to adjust, according to the target upper limit value, the number of logical units performing a read/write task in the storage device, so as to adjust the current power consumption of the storage device.

According to the apparatus for adjusting power consumption provided by the embodiment of the disclosure, the current power consumption of the storage device is acquired, and then the target power consumption of the storage device at the current power consumption level is compared with the current power consumption to adjust the initial upper limit value corresponding to the storage device, so as to obtain the adjusted target upper limit value. Thus, the storage device may adjust the number of the logical units performing the read/write task in the storage device according to the target upper limit value, so as to adjust the current power consumption of the storage device. Therefore, by adjusting the initial upper limit value corresponding to the storage device to obtain the target upper limit value, the number of the logical units performing the read/write task in the storage device is adjusted, thereby achieving adjustment of the power consumption of the storage device. The situation that normal use by a user is affected and inconvenience is caused to the user due to abnormal operation of the storage device caused by excessive current power consumption of the storage device may be avoided.

According to a third aspect, an embodiment of the disclosure provides an electronic device. The electronic device includes a memory and a processor, the memory and the processor are in communication connection to each other, the memory stores computer instructions, and the processor executes the computer instructions, so as to perform the method for adjusting power consumption in the first aspect or in any one of the implementations of the first aspect.

According to a fourth aspect, an embodiment of the disclosure provides a non-transitory computer readable storage medium. The computer readable storage medium stores computer instructions, and the computer instructions are configured to cause a computer to perform the method for adjusting power consumption in the first aspect or in any one of the implementations of the first aspect.

BRIEF DESCRIPTION OF THE DRAWINGS

In order to more clearly describe the technical solutions of the specific implementations of the disclosure or in the prior art, drawings that are to be referred for description of the specific implementations or the prior art will be briefly described hereinafter. Apparently, the drawings described hereinafter illustrate some embodiments implementation the disclosure, and a person of ordinary skill in the art may also derive other drawings based on the drawings described herein without any creative effort.

DETAILED DESCRIPTION OF THE EMBODIMENTS

In order to make the objective, technical solutions and advantages of embodiments of the disclosure clearer, the technical solutions in the embodiments of the disclosure will be clearly and completely described below with reference to the accompanying drawings in the embodiments of the disclosure. Apparently, the described embodiments are part of the embodiments of the disclosure, rather than all the embodiments. Based on the embodiments of the disclosure, all other embodiments derived by a person skilled in the art without any creative effort fall within the scope of protection of the disclosure.

It is to be noted that the executing subject of a method for adjusting power consumption provided by the embodiment of the disclosure may be an apparatus for adjusting power consumption, which may be implemented as a part or the whole of a storage device by means of software, hardware, or a combination of software and hardware. The following method embodiments are all illustrated with the example that the executing subject is a storage device.

Figure 1:
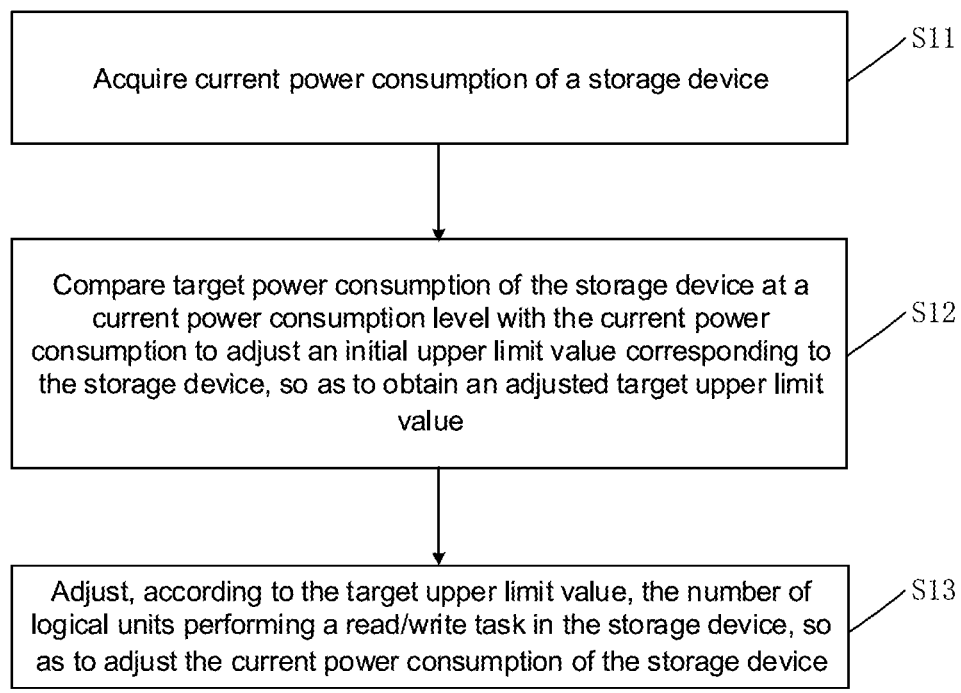
FIG. 1 is a flowchart of a method for adjusting power consumption according to an embodiment of the disclosure.

In an embodiment of the disclosure, as shown in FIG. 1, a method for adjusting power consumption is provided. Taking the method being applied to a storage device as an example for illustration, the method includes the following steps:

S11: Acquire current power consumption of the storage device.

Exemplarily, the storage device may acquire the current power consumption of the storage device according to the type of a task currently being performed and the number of logical units performing the task.

Exemplarily, any one logical unit in a certain model of the storage device consumes about 90 mW of power when performing a single read operation, any one logical unit consumes about 150 mW of power when performing a single programming operation, and any one logical unit consumes about 180 mW of power when performing a single erase operation.

This step will be described in detail below.

S12: Compare target power consumption of the storage device at a current power consumption level with the current power consumption to adjust an initial upper limit value corresponding to the storage device, so as to obtain an adjusted target upper limit value.

The initial upper limit value corresponding to the storage device may be stored in a flash power manager power allocation (FPMPA) register or in other memories corresponding to the storage device, and the embodiments of the disclosure do not make specific limitations on the storage location of the initial upper limit value.

Exemplarily, the storage device may acquire the target power consumption at the current power consumption level, compare the target power consumption at the current power consumption level with the current power consumption, and then adjust the initial upper limit value corresponding to the storage device according to the relationship between the target power consumption at the current power consumption level and the current power consumption, so as to obtain the adjusted target upper limit value.

The initial upper limit value corresponding to the storage device corresponds to the current power consumption level, that is, the storage device may determine the current power consumption level, and then compare the target power consumption at the current power consumption level with the current power consumption to adjust the initial upper limit value.

Exemplarily, it is assumed that power consumption levels corresponding to the storage device are divided into 8 levels, respectively from 0 to 7, as shown in Table 1 below, which shows the corresponding relationship between the power consumption levels and the initial upper limit value of the storage device.

TABLE 1

Corresponding table between power consumption level and initial upper limit value

| Power consumption level | Initial upper limit value |
| --- | --- |
| S0 | 128 |
| S1 | 90 |
| S2 | 72 |
| S3 | 60 |
| S4 | 50 |
| S5 | 42 |
| S6 | 36 |
| S7 | 32 |

This step will be described in detail below.

S13: Adjust, according to the target upper limit value, the number of logical units performing a read/write task in the storage device, so as to adjust the current power consumption of the storage device.

Exemplarily, after the initial upper limit value is adjusted to obtain the target upper limit value, the storage device may adjust the number of the logical units performing the read/write task in the storage device according to the target upper limit value, so as to adjust the current power consumption of the storage device.

Exemplarily, the storage device may reduce the number of logical units that are performing at least one of a read operation, a write operation, and an erase operation according to the target upper limit value and an important program of the task that is being performed, so as to adjust the current power consumption of the storage device and avoid abnormal operation of the storage device caused by excessive current power consumption of the storage device.

According to the method for adjusting power consumption provided by the embodiment of the disclosure, the current power consumption of the storage device is acquired, and then the target power consumption of the storage device at the current power consumption level is compared with the current power consumption to adjust the initial upper limit value corresponding to the storage device, so as to obtain the adjusted target upper limit value. Thus, the storage device may adjust the number of the logical units performing the read/write task in the storage device according to the target upper limit value, so as to adjust the current power consumption of the storage device. Therefore, by adjusting the initial upper limit value corresponding to the storage device to obtain the target upper limit value, the number of the logical units performing the read/write task in the storage device is adjusted, thereby achieving adjustment of the power consumption of the storage device. The situation that normal use by a user is affected and inconvenience is caused to the user due to abnormal operation of the storage device caused by excessive current power consumption of the storage device may be avoided.

Figure 2:
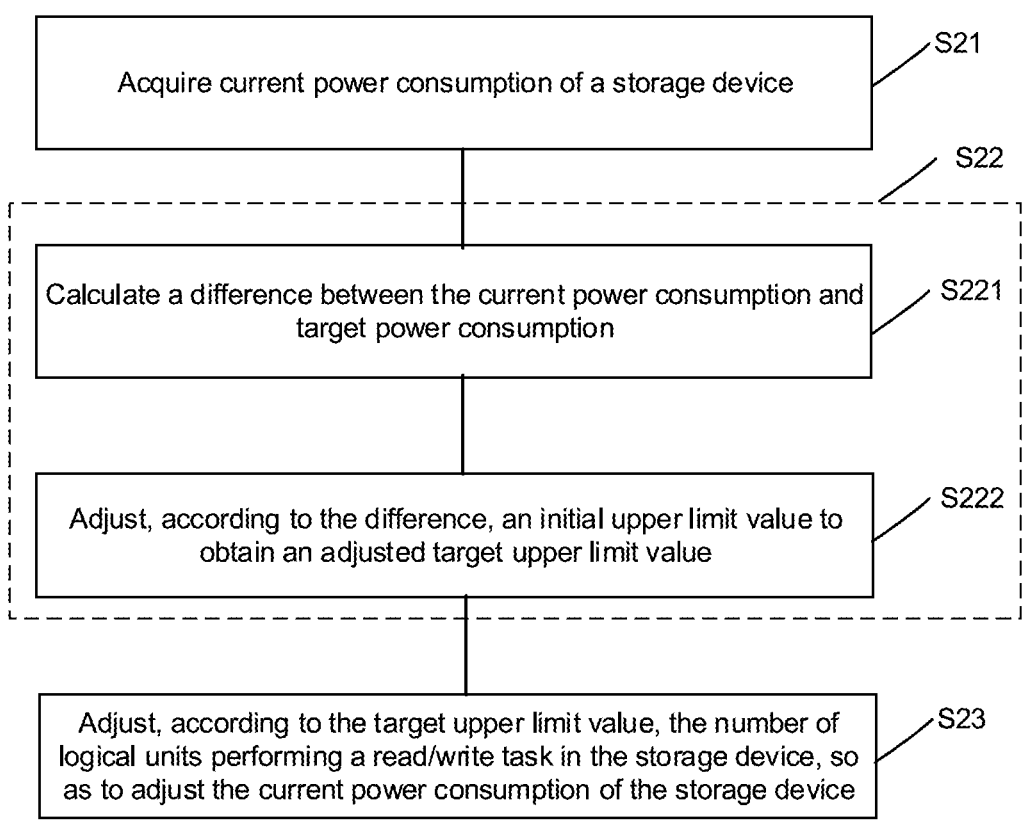
FIG. 2 is a flowchart of a method for adjusting power consumption according to another embodiment of the disclosure.

In an embodiment of the disclosure, as shown in FIG. 2, a method for adjusting power consumption is provided. Taking the method being applied to a storage device as an example for illustration, the method includes the following steps:

S21: Acquire current power consumption of the storage device.

This step may refer to the description of S11 in FIG. 1 and will not be repeated here.

S22: Compare target power consumption of the storage device at a current power consumption level with the current power consumption to adjust an initial upper limit value corresponding to the storage device, so as to obtain an adjusted target upper limit value.

Exemplarily, step S22, that is, the comparing target power consumption of the storage device at a current power consumption level with the current power consumption to adjust an initial upper limit value corresponding to the storage device, so as to obtain an adjusted target upper limit value, may include the following steps:

S221: Calculate a difference between the current power consumption and the target power consumption.

S222: Adjust, according to the difference, the initial upper limit value to obtain the adjusted target upper limit value.

Exemplarily, the storage device may substrate the target power consumption from the current power consumption to obtain the difference between the current power consumption and the target power consumption.

Then, the initial upper limit value is adjusted according to the difference between the current power consumption and the target power consumption, so as to obtain the adjusted target upper limit value.

In an optional implementation of the disclosure, step S222, that is, the adjusting, according to the difference, the initial upper limit value to obtain the adjusted target upper limit value, may include the following steps:

(1) Acquire, in the case where the difference is greater than a preset difference, an adjustment ratio corresponding to the storage device.

(2) Adjust, according to the adjustment ratio and the difference, the initial upper limit value to obtain the adjusted target upper limit value.

Exemplarily, the storage device may compare the difference between the current power consumption and the target power consumption with the preset difference, and acquire, when the difference between the current power consumption and the target power consumption is greater than the preset difference, the adjustment ratio corresponding to the storage device. The preset difference may be 3 W or 5 W, which is not specifically limited by the embodiments of the disclosure. The adjustment ratio may be related to the model and attribute information of the storage device.

After acquiring the adjustment ratio, the storage device may adjust the initial upper limit value according to the adjustment ratio and the difference to obtain the adjusted target upper limit value.

Exemplarily, the storage device may adjust the initial upper limit value according to the following formula to obtain the adjusted target upper limit value:

$$FPMPA_{set} = FPMPA_{current} + \frac{power_{sample} - power_{target}}{power\_per\_FPMPA} \quad (1)$$

where $FPMPA_{set}$ denotes the target upper limit value, $FPMPA_{current}$ denotes the initial upper limit value, $power_{sample}$ denotes the current power consumption, $power_{target}$ denotes the target power consumption, and power per FPMPA denotes the adjustment ratio.

In another optional implementation of the disclosure, step S222, that is, the adjusting, according to the difference, the initial upper limit value to obtain the adjusted target upper limit value, may include the following steps:

(3) Acquire, in the case where differences within a preset number of times are all less than or equal the preset difference, an integration constant according to the preset number of times.

(4) Adjust, according to the integration constant and a sum of the differences, the initial upper limit value to obtain the adjusted target upper limit value.

Exemplarily, in the embodiments of the disclosure, the storage device may acquire the current power consumption of the storage device a plurality of times, and compare the current power consumption with the target power consumption after acquiring the current power consumption each time to calculate the difference between the current power consumption and the target power consumption; and when the differences within the preset number of times are all less than or equal to the preset difference, the storage device determines that there is a static error between the current power consumption and the target power consumption.

The storage device then acquires the integration constant according to the preset number of times, and adjusts, according to the integration constant and the sum of the differences, the initial upper limit value to obtain the adjusted target upper limit value.

Exemplarily, the storage device may adjust the initial upper limit value according to the following formula to obtain the adjusted target upper limit value:

$$FPMPA_{set} = FPMPA_{current} + \frac{\sum \Delta power_{mini}}{\varepsilon} \quad (2)$$

where $FPMPA_{set}$ denotes the target upper limit value, $FPMPA_{current}$ denotes the initial upper limit value, $\Delta power_{mini}$ denotes the difference between the current power consumption and the target power consumption, and e denotes the integration constant, the integration constant being related to the preset number of times.

S23: Adjust, according to the target upper limit value, the number of logical units performing a read/write task in the storage device, so as to adjust the current power consumption of the storage device.

This step may refer to the description of S13 in FIG. 1 and will not be repeated here.

According to the method for adjusting power consumption provided by the embodiment of the disclosure, the difference between the current power consumption and the target power consumption is calculated, and then the initial upper limit value is adjusted according to the difference, so as to obtain the adjusted target upper limit value. Thus, the accuracy of the target upper limit value obtained after adjustment of the initial upper limit value is ensured, thereby ensuring the accuracy of adjusting the number of logical units performing the read/write task according to the target upper limit value.

When the difference is greater than the preset difference, the adjustment ratio corresponding to the storage device is acquired, and then the initial upper limit value is adjusted according to the adjustment ratio and the difference, so as to obtain the adjusted target upper limit value. When the differences within the preset number of times are all less than or equal to the preset difference, the integration constant is acquired according to the preset number of times, and then the initial upper limit value is adjusted according to the integration constant and the sum of the differences, so as to obtain the adjusted target upper limit value. Thus, the accuracy of the obtained adjusted target upper limit value is ensured.

Figure 3:
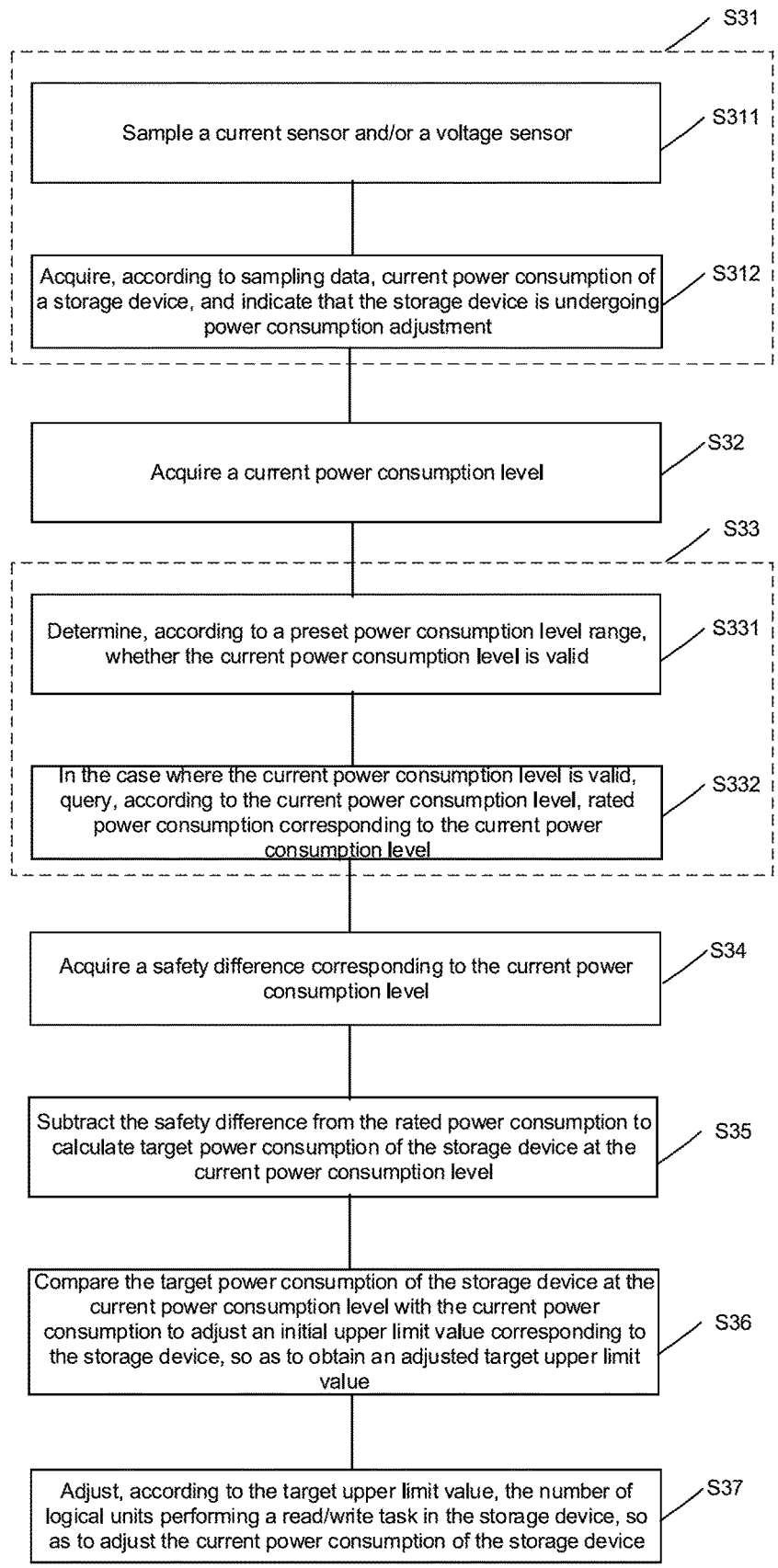
FIG. 3 is a flowchart of a method for adjusting power consumption according to yet another embodiment of the disclosure.

In an embodiment of the disclosure, as shown in FIG. 3, a method for adjusting power consumption is provided.

Taking the method being applied to a storage device as an example for illustration, the method includes the following steps:

S31: Acquire current power consumption of the storage device.

In an optional implementation of the disclosure, S31, that is, the acquiring current power consumption of the storage device, may include the following steps:

S311: Sample a current sensor and/or a voltage sensor.

S312: Acquire, according to sampling data, the current power consumption of the storage device, and indicate that the storage device is undergoing power consumption adjustment.

Exemplarily, the storage device may sample the current sensor and/or the voltage sensor a plurality of times, and a time interval for sampling the current sensor and/or the voltage sensor each time may be the same or different. The time interval may be 2 S or 3 S, which is not specifically limited by the embodiments of the disclosure.

The storage device then calculates the current power consumption of the storage device according to the sampling data acquired by sampling the current sensor and/or the voltage sensor, and indicates that the storage device is undergoing power consumption adjustment.

Exemplarily, the storage device may calculate the current power consumption of the storage device by multiplying collected current data by voltage data.

The storage device may control a power consumption adjustment indicator to emit light, so as to indicate that the storage device is undergoing power consumption adjustment.

S32: Acquire a current power consumption level.

Exemplarily, the storage device may receive the current power consumption level input by a user.

S33: Query, according to the current power consumption level, rated power consumption corresponding to the current power consumption level.

Exemplarily, the storage device may query the rated power consumption corresponding to the current power consumption level according to a corresponding relationship between power consumption levels and rated power.

Exemplarily, it is assumed that power consumption levels corresponding to the storage device are divided into 8 levels, respectively from 0 to 7. Table 2 is a corresponding table between the power consumption levels and the rated power.

| Power consumption level | Rated power consumption |
|---|---|
| S0 | Not limited (or 25 W) |
| S1 | 23 W |
| S2 | 21 W |
| S3 | 19 W |
| S4 | 17 W |
| S5 | 15 W |
| S6 | 13 W |
| S7 | 11 W |

In an optional implementation of the disclosure, S33, that is, the querying, according to the current power consumption level, rated power consumption corresponding to the current power consumption level, may include the following steps:

S331: Determine, according to a preset power consumption level range, whether the current power consumption level is valid.

S332: In the case where the current power consumption level is valid, query, according to the current power consumption level, the rated power consumption corresponding to the current power consumption level.

Exemplarily, after acquiring the current power consumption level, the storage device may determine whether the current power consumption level is within the power consumption level range according to the preset power consumption level range, thereby determining whether the current power consumption level is valid.

When the current power consumption level is within the power consumption level range, the storage device determines that the current power consumption level is valid, and then queries the rated power consumption corresponding to the current power consumption level according to the corresponding relationship between the power consumption levels and the rated power.

When the current power consumption level is not within the power consumption level range, the storage device determines that the current power consumption level is invalid, and outputs a message indicating that the current power consumption is invalid to the user, so as to allow the user to modify the current power consumption level.

S34: Acquire a safety difference corresponding to the current power consumption level.

Exemplarily, after determining that the current power consumption level is valid, the storage device acquires the safety difference corresponding to the current power consumption level according to the current power consumption level.

Exemplarily, when the current power consumption level is level 1, the safety difference is 5 W; and when the current power consumption level is level 2, the safety difference is 3 W.

S35: Subtract the safety difference from the rated power consumption to calculate the target power consumption of the storage device at the current power consumption level.

Exemplarily, the storage device, after acquiring the rated power consumption corresponding to the current power consumption and the safety difference, may subtract the safety difference from the rated power consumption to calculate the target power consumption of the storage device at the current power consumption level.

S36. Compare the target power consumption of the storage device at the current power consumption level with the current power consumption to adjust an initial upper limit value corresponding to the storage device, so as to obtain an adjusted target upper limit value.

This step may refer to the description of S22 in FIG. 2 and will not be repeated here.

S37: Adjust, according to the target upper limit value, the number of logical units performing a read/write task in the storage device, so as to adjust the current power consumption of the storage device.

This step may refer to the description of S23 in FIG. 2 and will not be repeated here.

According to the method for adjusting power consumption provided by the embodiment of the disclosure, the current sensor and/or the voltage sensor is sampled, so that the accuracy of the obtained sampling data may be ensured. Then, the current power consumption of the storage device is acquired according to the sampling data, and it is indicated that the storage device is undergoing power consumption adjustment, so that the accuracy of the acquired current power consumption of the storage device is ensured. In addition, by indicating that the storage device is undergoing power consumption adjustment, the user may clearly know that the storage device is undergoing power consumption adjustment.

In addition, according to the method for adjusting power consumption provided by the embodiment of the disclosure, the current power consumption level is acquired, and whether the current power consumption level is valid is determined according to the preset power consumption level range, so that validity of the current power consumption level is ensured. In the case where the current power consumption level is valid, the rated power consumption corresponding to the current power consumption level is queried according to the current power consumption level. Thus, the accuracy of the queried rated power consumption corresponding to the current power consumption level is ensured. Then, the safety difference corresponding to the current power consumption level is acquired, and the target power consumption of the storage device at the current power consumption level is calculated by subtracting the safety difference from the rated power consumption. Thus, the accuracy of the calculated target power consumption of the storage device at the current power consumption level is ensured, and the safety of the storage device is ensured when the power consumption reaches the target power consumption at the current power consumption level.

Figure 4:
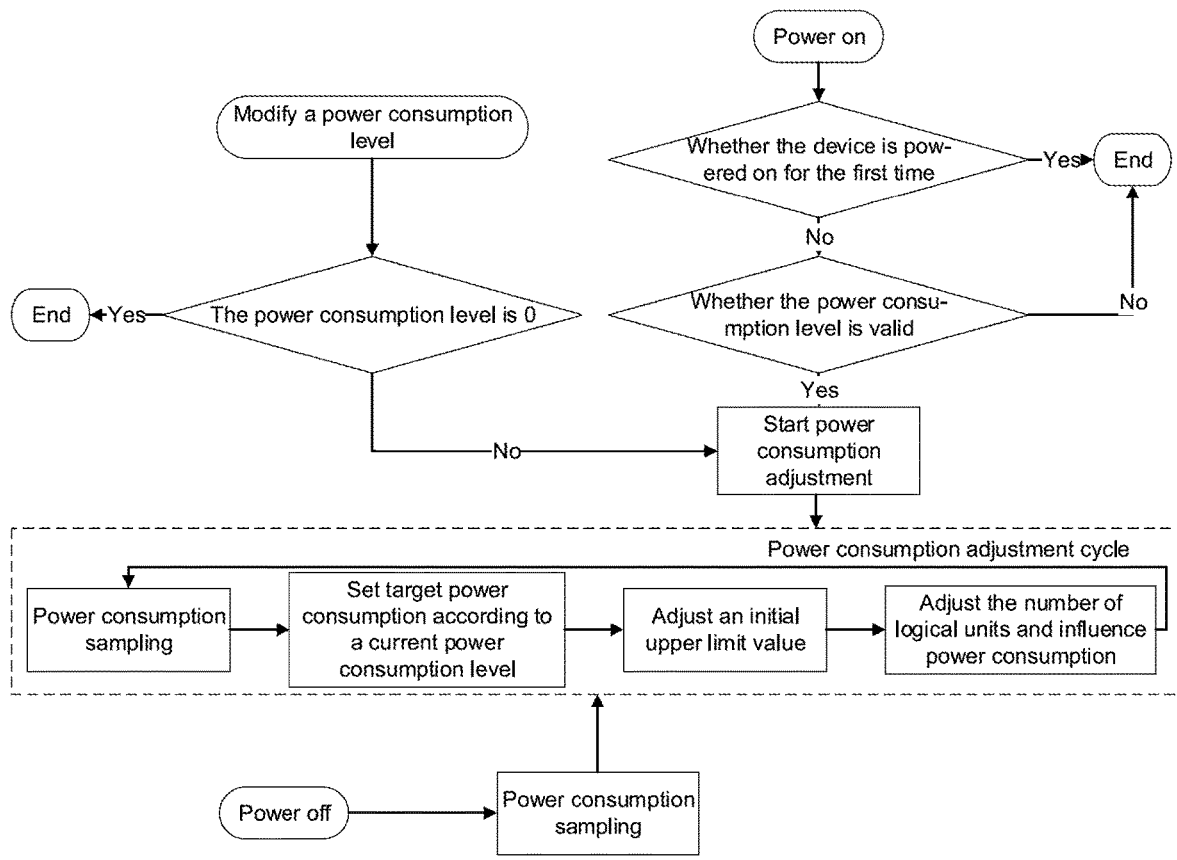
FIG. 4 is a flowchart of a method for adjusting power consumption according to yet another embodiment of the disclosure.

In an optional implementation of the disclosure, as shown in FIG. 4, it is assumed that the power consumption levels corresponding to the storage device may be divided into 8 levels, respectively from 0 to 7. After the storage device is powered on, whether the storage device is powered on for the first time is determined firstly. If the storage device is not powered on for the first time, the current power consumption level is acquired, and whether the current power consumption level is valid is determined according to the preset power consumption level range.

When the current power consumption level is valid, the current power consumption level is acquired. When the current power consumption level acquired by the storage device is level 0, the storage device does not limit the upper limit of the current power consumption. The rated power consumption corresponding to the power consumption level 0 of the storage device may be the highest performance and maximum power consumption of operation of the storage device. In this case, the storage device may set a timer with a period of a preset time to sample the current/voltage sensor at preset intervals, calculate and report the current power consumption, but does not adjust the current power consumption. The preset time may be 15 S or 10 S, which is not specifically limited by the embodiments of the disclosure.

When the current power consumption level acquired by the storage device is not level 0, the storage device acquires the current power consumption of the storage device; the storage device compares the target power consumption of the storage device at the current power consumption level with the current power consumption to adjust the initial upper limit value corresponding to the storage device, so as to obtain the adjusted target upper limit value; and the number of the logical units performing the read/write task in the storage device is adjusted according to the target upper limit value, so as to adjust the current power consumption of the storage device.

When the storage device detects that the current power consumption level is changed to a target power consumption level, the storage device may firstly detect whether the target power consumption level is changed to level 0. When the target power consumption level is level 0, the storage device may set the timer with the period of the preset time to sample the current/voltage sensor at preset intervals, calculate and report the current power consumption, but does not adjust the current power consumption.

When the target power consumption level is not level 0, the storage device may firstly change the target upper limit value of the current power consumption to the initial upper limit value corresponding to the target power consumption level according to the corresponding relationship between the power consumption level and the initial upper limit value in Table 1, and then adjust the current power consumption of the storage device according to the initial upper limit value corresponding to the target power consumption level.

TABLE 1

Corresponding table between power consumption level and initial upper limit value

| Power consumption level | Initial upper limit value |
| --- | --- |
| S0 | 128 |
| S1 | 90 |
| S2 | 72 |
| S3 | 60 |
| S4 | 50 |
| S5 | 42 |
| S6 | 36 |
| S7 | 32 |

Exemplarily, it is assumed that the current power consumption level is level 3, and after the storage device adjusts the current power consumption, the current target upper limit value is 55. When the storage device detects that the current power consumption level is changed to level 6, the storage device directly changes the target upper limit value of 55 to the initial upper limit value of 36 corresponding to the power consumption level 6, and then adjusts the number of logical units performing the read/write task in the storage device according to the initial upper limit value of 36, so as to adjust the current power consumption of the storage device.

It is to be understood that although the steps in the flowcharts of FIGS. 1-4 are shown sequentially as indicated by the arrows, the steps are not necessarily performed sequentially in the order indicated by the arrows. Unless expressly stated herein, there is no strict order in which the steps are performed, and the steps may be performed in other orders. Moreover, at least a portion of the steps in FIGS. 1-4 may include a plurality of steps or a plurality of stages, which are not necessarily performed to completion at the same moment, but may be performed at different moments, and the order in which the steps or stages are performed is not necessarily sequential, but may be performed in turn or alternately with other steps or at least a portion of steps or stages of other steps.

Figure 5:
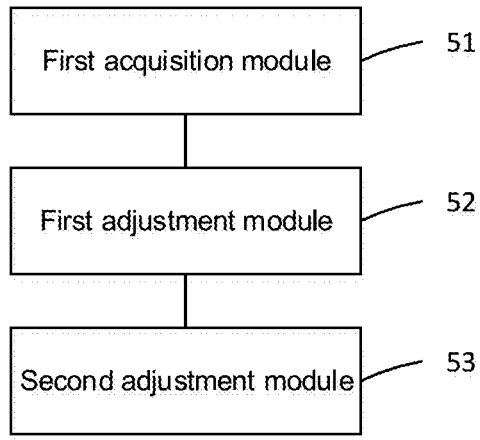
FIG. 5 is a functional module diagram of an apparatus for adjusting power consumption according to an embodiment of the disclosure.

As shown in FIG. 5, this embodiment provides an apparatus for adjusting power consumption. The apparatus is applied to a storage device and includes:
  a first acquisition module 51, configured to acquire current power consumption of the storage device;
  a first adjustment module 52, configured to compare target power consumption of the storage device at a current power consumption level with the current power consumption to adjust an initial upper limit value corresponding to the storage device, so as to obtain an adjusted target upper limit value; and
  a second adjustment module 53, configured to adjust, according to the target upper limit value, the number of logical units performing a read/write task in the storage device, so as to adjust the current power consumption of the storage device.

In an embodiment of the disclosure, the first adjustment module 52 is configured to calculate a difference between the current power consumption and the target power consumption; and adjust, according to the difference, the initial upper limit value to obtain the adjusted target upper limit value.

In an embodiment of the disclosure, the first adjustment module 52 is configured to acquire, in a case that the difference is greater than a preset difference, an adjustment ratio corresponding to the storage device; and adjust, according to the adjustment ratio and the difference, the initial upper limit value to obtain the adjusted target upper limit value.

In an embodiment of the disclosure, the first adjustment module 52 is configured to acquire, in a case that differences within a preset number of times are all less than or equal to the preset difference, an integration constant according to the preset number of times; and adjust, according to the integration constant and a sum of the differences, the initial upper limit value to obtain the adjusted target upper limit value.

Figure 6:
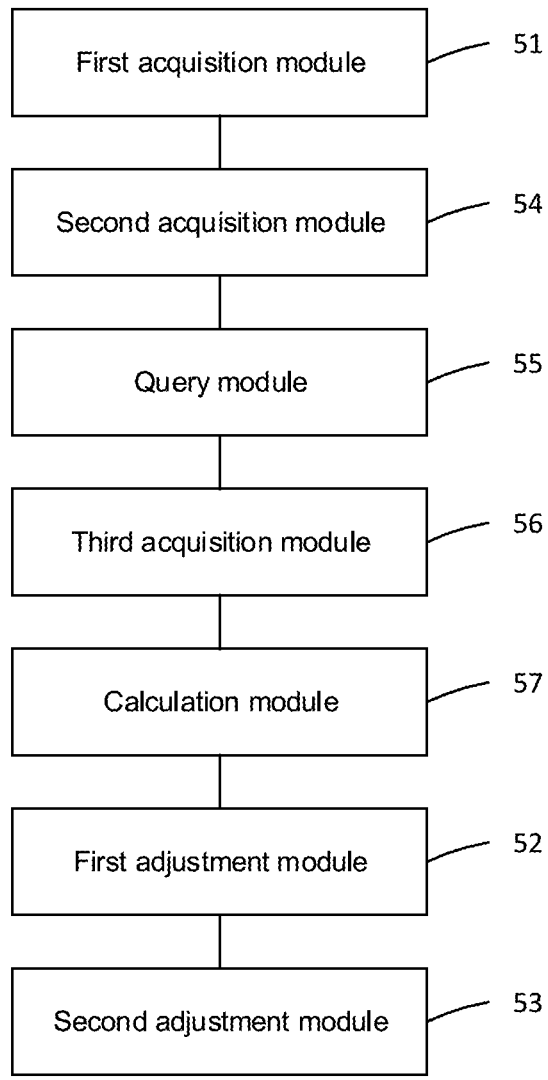
FIG. 6 is a functional module diagram of an apparatus for adjusting power consumption according to an embodiment of the disclosure.

In an embodiment of the disclosure, as shown in FIG. 6, the apparatus for adjusting power consumption further includes:
- a second acquisition module 54, configured to acquire the current power consumption level;
- a query module 55, configured to query, according to the current power consumption level, rated power consumption corresponding to the current power consumption level;
- a third acquisition module 56, configured to acquire a safety difference corresponding to the current power consumption level; and
- a calculation module 57, configured to subtract the safety difference from the rated power consumption to calculate the target power consumption of the storage device at the current power consumption level.

In an embodiment of the disclosure, the query module 55 is configured to determine, according to a preset power consumption level range, whether the current power consumption level is valid; and query, in a case that the current power consumption level is valid, the rated power consumption corresponding to the current power consumption level according to the current power consumption level.

In an embodiment of the disclosure, the first acquisition module 51 is configured to sample a current sensor and/or a voltage sensor; and acquire, according to sampling data, the current power consumption of the storage device, and indicate that the storage device is undergoing power consumption adjustment.

Specific limitations on and the beneficial effects of the apparatus for adjusting power consumption may be referred to the above limitations on the method for adjusting power consumption, which will not be repeated here. The various modules in the foregoing apparatus for adjusting power consumption may be implemented in whole or in part by software, hardware, and a combination thereof. The above modules may be embedded in hardware form in or independent of a processor in the storage device, or may be stored in software form in a memory in the storage device so as to be called by the processor to perform the operations corresponding to the above modules.

An embodiment of the disclosure further provides a storage device. The storage device is provided with the apparatus for adjusting power consumption as shown in FIG. 5 or FIG. 6.

Figure 7:
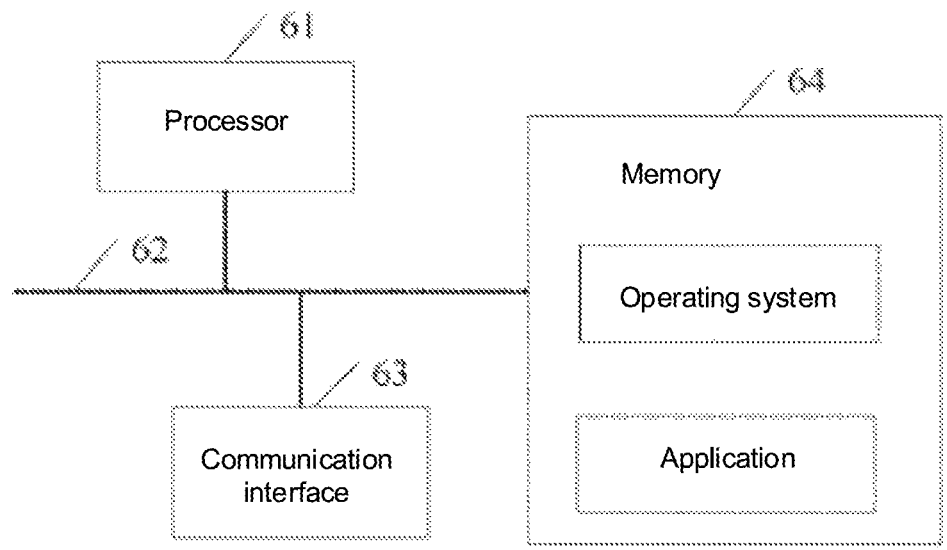
FIG. 7 is a schematic diagram of a hardware structure of a storage device according to an embodiment of the disclosure.

FIG. 7 is a schematic structural diagram of a storage device according to an optional embodiment of the disclosure. As shown in FIG. 7, the storage device may include: at least one processor 61, at least one communication interface 63, a memory 64, and at least one communication bus 62. The communication bus 62 is used to achieve connection communication between these components. The communication interface 63 may include a standard wired interface and a wireless interface. The memory 64 may be a high-speed random access memory (RAM) or a non-transitory memory, such as at least one disk memory. The memory 64 optionally may also be at least one storage position located away from the aforementioned processor 61. The processor 61 may be combined with the apparatus described in FIG. 5 or FIG. 6, an application is stored in the memory 64, and the processor 61 calls a program code stored in the memory 64 for use in performing the steps of any one of the methods described above.

The communication bus 62 may be a peripheral component interconnect (PCI) bus or an extended industry standard architecture (EISA) bus, or the like. The communication bus 62 may be divided into an address bus, a data bus, a control bus, and the like. For ease of representation, FIG. 7 is represented by only one thick line, but it does not mean that there is only one bus or one type of bus.

The memory 64 may include a transitory memory, such as a random access memory (RAM); the memory may also include a non-transitory memory, such as a flash memory, a hard disk drive (HDD) or a solid-state drive (SSD); and the memory 64 may also include a combination of the above types of memories.

The processor 61 may be a central processing unit (CPU), a network processor (NP) or a combination of the CPU and the NP.

The processor 61 may further include a hardware chip. The hardware chip may be an application-specific integrated circuit (ASIC), a programmable logic device (PLD) or a combination thereof. The PLD may be a complex programmable logic device (CPLD), a field-programmable logic gate array (FPGA), a generic array logic (GAL) or any combination thereof.

Optionally, the memory 64 is also used to store program instructions. The processor 61 may call the program instructions to implement the method for adjusting power consumption as shown in the embodiments in FIGS. 1 to 4 of the disclosure.

An embodiment of the disclosure further provides a non-transitory computer storage medium. The computer storage medium stores computer-executable instructions. The computer-executable instructions may perform the method for adjusting power consumption in any one of the method embodiments described above. The storage medium may be a disk, a CD-ROM, a read-only memory (ROM), a random access memory (RAM), a flash memory, a hard disk drive (HDD), or a solid-state drive (SSD), etc. The storage medium may further include a combination of the above types of memories.

Figure 8:
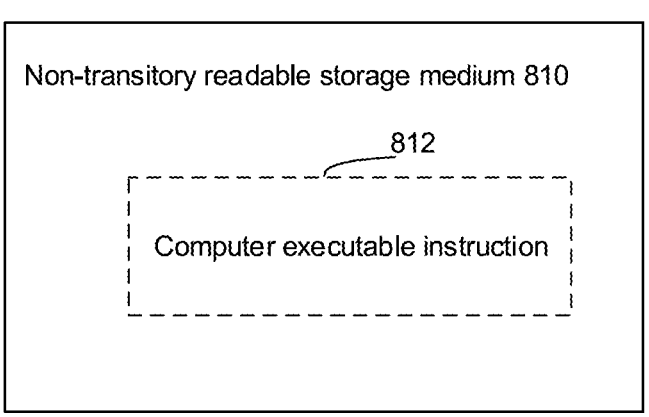
FIG. 8 is a schematic structural diagram of a non-transitory computer readable storage medium according to an embodiment of the disclosure.

An embodiment of the disclosure further provides a non-transitory computer readable storage medium. Referring to FIG. 8, which illustrates a schematic structural diagram of a non-transitory computer readable storage medium according to an embodiment of the disclosure, the non-transitory computer readable storage medium 810 stores computer-executable instructions 812 which, when executed by a processor, implement the steps of any one of the method for adjusting power consumption described above.

Although embodiments of the disclosure are described in conjunction with the accompanying drawings, various modifications and variations may be made by those skilled in the art without departing from the spirit and scope of the disclosure, and such modifications and variations fall within the scope defined by the appended claims.

What is claimed is:

1. A method for adjusting power consumption, applying to a storage device and comprising:
acquiring current power consumption of the storage device;
adjusting an initial upper limit value corresponding to the storage device according to comparison of a target power consumption with the current power consumption of the storage device at a current power consumption level, so as to obtain an adjusted target upper limit value; and
adjusting a number of logical units performing a read and write task in the storage device according to the target upper limit value, so as to adjust the current power consumption of the storage device.

2. The method according to claim 1, wherein the adjusting an initial upper limit value corresponding to the storage device according to comparison of a target power consumption with a current power consumption of the storage device at a current power consumption level, so as to obtain an adjusted target upper limit value comprises:
calculating a difference between the current power consumption and the target power consumption; and
adjusting, according to the difference, the initial upper limit value to obtain the adjusted target upper limit value.

3. The method according to claim 2, wherein the adjusting, according to the difference, the initial upper limit value to obtain the adjusted target upper limit value comprises:
acquiring, in a case that the difference is greater than a preset difference, an adjustment ratio corresponding to the storage device; and
adjusting, according to the adjustment ratio and the difference, the initial upper limit value to obtain the adjusted target upper limit value.

4. The method according to claim 3, further comprising:
acquiring, in a case that differences within a preset number of times are all less than or equal to the preset difference, an integration constant according to the preset number of times; and
adjusting, according to the integration constant and a sum of the differences, the initial upper limit value to obtain the adjusted target upper limit value.

5. The method according to claim 4, wherein the acquiring, in a case that differences within a preset number of times are all less than or equal to the preset difference, an integration constant according to the preset number of times comprises:
determining, in a case that the differences within the preset number of times are all less than or equal to the preset difference, that there is a static error between the current power consumption and the target power consumption.

6. The method according to claim 1, before adjusting an initial upper limit value corresponding to the storage device according to comparison of a target power consumption with a current power consumption of the storage device at a current power consumption level, the method further comprises:
querying, according to the current power consumption level, rated power consumption corresponding to the current power consumption level;
acquiring a safety difference corresponding to the current power consumption level; and
subtracting the safety difference from the rated power consumption to calculate the target power consumption of the storage device at the current power consumption level.

7. The method according to claim 6, wherein the querying, according to the current power consumption level, rated power consumption corresponding to the current power consumption level comprises:
judging, according to a preset power consumption level range, whether the current power consumption level is valid; and
in a case that the current power consumption level is valid, querying, according to the current power consumption level, the rated power consumption corresponding to the current power consumption level.

8. The method according to claim 7, wherein the judging, according to a preset power consumption level range, whether the current power consumption level is valid comprises:
determining, in a case that the current power consumption level of the storage device is within the power consumption level range, that the current power consumption level is valid; and
determining, in a case that the current power consumption level of the storage device is not within the power consumption level range, that the current power consumption level is invalid.

9. The method according to claim 7, wherein the judging, according to a preset power consumption level range, whether the current power consumption level is valid further comprises:
outputting, in a case that the current power consumption level is invalid, a message indicating that the current power consumption is invalid.

10. The method according to claim 7, wherein the acquiring a safety difference corresponding to the current power consumption level comprises:
upon determining that the current power consumption level of the storage device is valid, acquiring, according to the current power consumption level, the safety difference corresponding to the current power consumption level.

11. The method according to claim 6, wherein the acquiring the current power consumption level comprises:
receiving the current power consumption level input by a user.

12. The method according to claim 6, wherein the querying, according to the current power consumption level, rated power consumption corresponding to the current power consumption level comprises:
querying the rated power consumption corresponding to the current power consumption level according to a corresponding relationship between power consumption levels and rated power.

13. The method according to claim 1, wherein the acquiring current power consumption of the storage device comprises:
sampling a current sensor and/or a voltage sensor; and
acquiring, according to sampling data, the current power consumption of the storage device, and indicating that the storage device is undergoing power consumption adjustment.

14. The method according to claim 13, wherein the sampling a current sensor and/or a voltage sensor comprises:
sampling the current sensor and/or the voltage sensor a plurality of times.

15. The method according to claim 13, wherein the acquiring, according to sampling data, the current power consumption of the storage device comprises:
acquiring the current power consumption of the storage device by multiplying collected current data by voltage data.

16. The method according to claim 13, wherein the indicating that the storage device is undergoing power consumption adjustment comprises:
indicating that the storage device is undergoing power consumption adjustment by controlling a power consumption adjustment indicator of the storage device to emit light.

17. The method according to claim 1, before adjusting an initial upper limit value corresponding to the storage device according to comparison of a target power consumption with a current power consumption of the storage device at a current power consumption level, the method further comprises:
determining, according to the current power consumption level, the initial upper limit value corresponding to the current power consumption level.

18. The method according to claim 1, wherein the adjusting a number of logical units performing a read and write task in the storage device according to the target upper limit value, so as to adjust the current power consumption of the storage device comprises:
reducing, according to the target upper limit value and a program of the task being performed by the storage device, the number of logical units that are performing at least one of a read operation, a write operation, and an erase operation.

19. A storage device, comprising a memory and a processor, the memory is configured to store computer instructions, and the processor is configured to execute the computer instructions to:
acquire current power consumption of the storage device;
adjust an initial upper limit value corresponding to the storage device according to comparison of a target power consumption with the current power consumption of the storage device at a current power consumption level, so as to obtain an adjusted target upper limit value; and
adjust a number of logical units performing a read and write task in the storage device according to the target upper limit value, so as to adjust the current power consumption of the storage device.

20. A non-transitory computer readable storage medium, storing computer instructions, and when executed by a computer, the computer instructions are configured to cause the computer to:
acquire current power consumption of the storage device;
adjust an initial upper limit value corresponding to the storage device according to comparison of a target power consumption with the current power consumption of the storage device at a current power consumption level, so as to obtain an adjusted target upper limit value; and
adjust a number of logical units performing a read and write task in the storage device according to the target upper limit value, so as to adjust the current power consumption of the storage device.

\* \* \* \* \*